(12) United States Patent
Bidgoli et al.

(10) Patent No.: US 11,870,678 B2
(45) Date of Patent: Jan. 9, 2024

(54) CONFIGURING ROUTES BASED ON PASSIVE MONITORING OF ADVERTISEMENTS TO ROUTE REFLECTOR

(71) Applicant: Nokia Solutions and Networks Oy, Espoo (FI)

(72) Inventors: Hooman Bidgoli, Ottawa (CA); Andrew Stone, Ottawa (CA)

(73) Assignee: Nokia Solutions and Networks Oy, Espoo (FI)

( * ) Notice: Subject to any disclaimer, the term of this patent is extended or adjusted under 35 U.S.C. 154(b) by 226 days.

(21) Appl. No.: 17/185,574

(22) Filed: Feb. 25, 2021

(65) Prior Publication Data

US 2022/0272023 A1 Aug. 25, 2022

(51) Int. Cl.
*H04L 45/02* (2022.01)
*H04L 12/46* (2006.01)
*H04L 45/00* (2022.01)
*H04L 45/488* (2022.01)

(52) U.S. Cl.
CPC .......... *H04L 45/02* (2013.01); *H04L 12/4641* (2013.01); *H04L 45/26* (2013.01); *H04L 45/488* (2022.05)

(58) Field of Classification Search
CPC ..... H04L 12/4641; H04L 45/26; H04L 67/14; H04L 45/74; H04L 45/02
See application file for complete search history.

(56) References Cited

U.S. PATENT DOCUMENTS

| | | | |
|---|---|---|---|
| 8,571,029 B1 * | 10/2013 | Aggarwal | H04L 45/50 370/256 |
| 9,706,014 B1 | 7/2017 | Rijsman | |
| 10,623,322 B1 * | 4/2020 | Nallamothu | H04L 45/745 |
| 11,089,533 B2 * | 8/2021 | Savolainen | H04L 45/26 |
| 2016/0248658 A1 * | 8/2016 | Patel | H04L 45/127 |
| 2019/0089620 A1 | 3/2019 | Hefel et al. | |
| 2020/0204622 A1 * | 6/2020 | Thyagarajan | H04L 67/1078 |

(Continued)

OTHER PUBLICATIONS

European Search Report mailed in corresponding EP 22153726.9 dated Jul. 13, 2022, 9 pages.

(Continued)

*Primary Examiner* — Xavier S Wong
(74) *Attorney, Agent, or Firm* — Tong, Rea, Bentley & Kim, LLC

(57) ABSTRACT

A controller includes a transceiver to establish a first session with a route reflector and monitor advertisements received by the route reflector from nodes in a network via second sessions established between the nodes and the route reflector. The controller also includes a processor to generate forwarding instructions for the nodes based on the advertisements. The forwarding instructions indicate one or more routes from a root node to one or more leaf nodes of a service. The transceiver provides the forwarding instructions to the root node. In some cases, the first session is established according to the border gateway protocol (BGP) and the one or more second sessions are established according to the BGP. The controller determines that the one or more leaf nodes are registered for one or more virtual private network (VPN) services based on the advertisements.

24 Claims, 4 Drawing Sheets

(56) References Cited

U.S. PATENT DOCUMENTS

2021/0306256 A1* 9/2021 Ward ..................... H04L 45/04

OTHER PUBLICATIONS

Bidgoli, et al., "PCEP extensions for p2mp sr policy," IETF, Network Working Group, draft-hsd-pce-sr-p2mp-policy-02, Oct. 30, 2020, 40 pages.

Aggarwal, et al., "BGP Encodings and Procedures for Multicast in MPLS/BGP IP VPNs," IETF, RFC 6514, Feb. 2012, 59 pages.

Rosen, et al., "Multicast in MPLS/BGP IP VPNs," IETF, RFC 6513, Feb. 2012, 88 pages.

Bidgoli, et al., "Advertising p2mp policies in BGP," IETF, Network Working Group, draft-hb-idr-sr-p2mp-policy-01, Oct. 28, 2020, 16 pages.

Voyer, et al., "Segment Routing Point-to-Multipoint Policy," IETF, Network Working Group, draft-voyer-pim-sr-p2mp-policy-02, Jul. 10, 2020, 16 pages.

* cited by examiner

CONFIGURING ROUTES BASED ON PASSIVE MONITORING OF ADVERTISEMENTS TO ROUTE REFLECTOR

BACKGROUND

An Internet protocol (IP) network includes interconnected routers that convey packets between a source or root node and one or more destinations or leaf nodes. The paths between nodes in the IP network are determined using interior gateway protocols (IGPs) by applying link state protocols such as open shortest path first (OSPF, OSPFv3), intermediate system-to-intermediate system (IS-IS), and the like to flood information indicating the status of locally connected networks and links of the nodes across the network. Nodes or links in larger IP networks are subdivided or partitioned into subsets to manage and contain link state flooding. For example, an interior gateway protocol (IGP) domain (or IGP instance) can be partitioned into IGP areas that include subsets of the routers in the IGP domain. The IGP areas are interconnected by border routers that stitch together the IGP areas. Path computation elements (PCE) or other software defined networking (SDN) controllers compute traffic engineered (TE) paths across IGP areas and domain boundaries. Inter-area and inter-domain topology information that represents links/edges and nodes is provided to the PCE/SDN controllers to provide full network visibility so that the PCE/SDN controllers have a complete view of the network.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
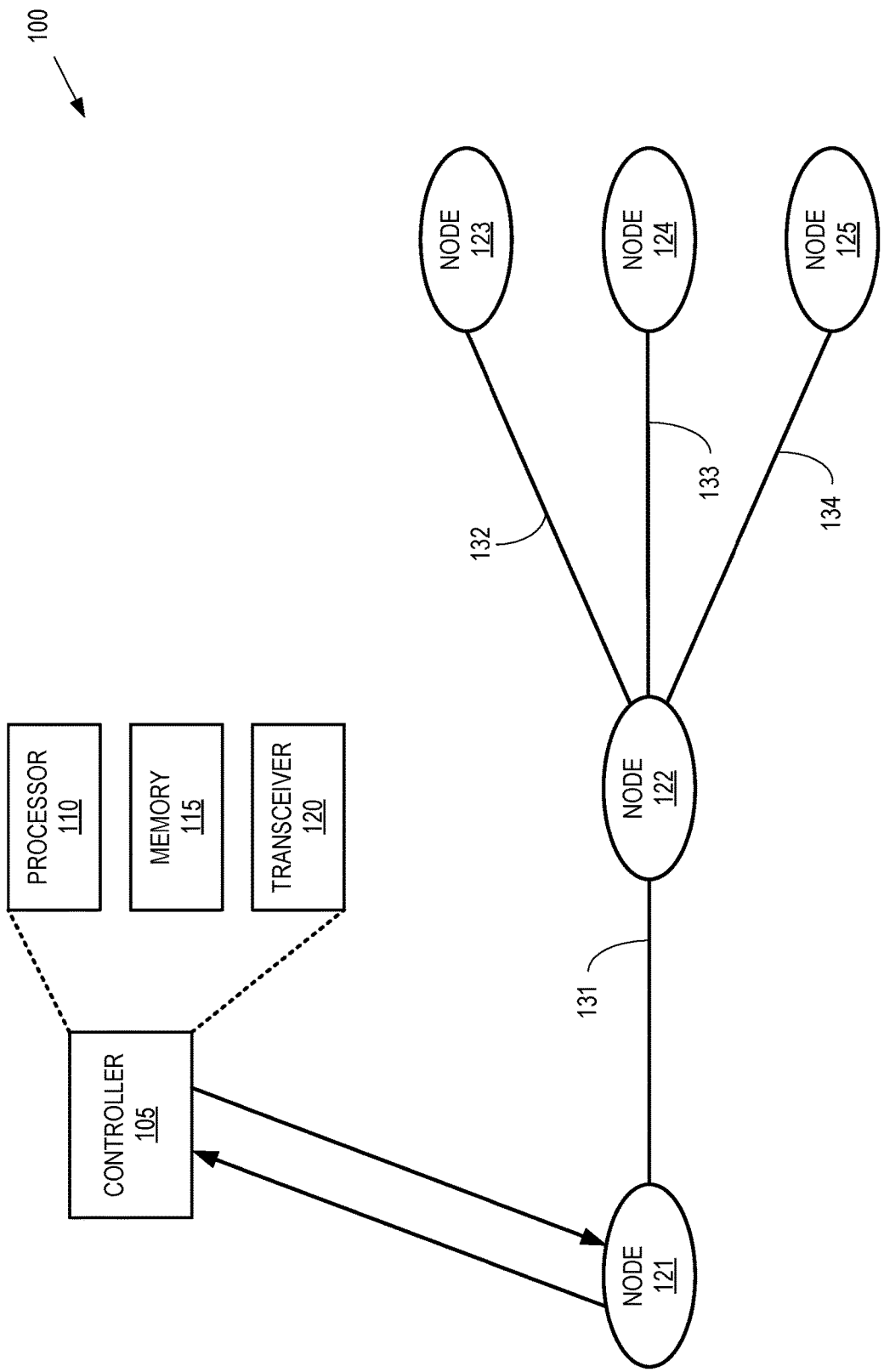
FIG. 1 is a block diagram of an IP network that includes a controller for configuring routes based on passive monitoring of advertisements according to some embodiments.

A path computation client (PCC) is a client application that transmits a request for a path computation to a PCE or receives instructions from the PCE in response to the PCE initiating the instructions. Communication between a PCC and a PCE can be performed according to the Path Computation Element Protocol (PCEP), which is defined by the IETF PCE Working Group. PCEP is a transmission control protocol (TCP)-based protocol that defines a set of messages and objects used to manage PCEP sessions and to request and send paths for multidomain TE label switched paths (LSPs). The PCEP interactions include LSP status reports sent by the PCC to the PCE and PCE updates for the external LSPs. The PCE can compute paths through the network based on the information exchanged according to the defined PCE. For example, the PCE can determine TE paths that represent a multicast tree that begins at a root node and replicates packets toward a set of leaf nodes, potentially via a set of transit nodes. The PCC provides information identifying the set of leaves, the tree, and the root provided from the root node to the PCE using PCEP messages. The PCE computes the tree based on the received information and downloads forwarding information to corresponding nodes, which use the forwarding information to build the data path of the tree on the PCC.

One alternative to PCEP is the border gateway protocol (BGP), which is a control plane protocol for exchanging routing information and supporting flexible policy-based routing. A BGP session runs as an application atop a transport layer protocol such as TCP, which provides lossless, reliable, in-order delivery of BGP messages. In some cases, leaf nodes are allocated different autonomous system numbers (ASNs) and BGP sessions are formed between the entities associated with each ASN. To form BGP sessions, a BGP node performs neighbor discovery to determine a neighbor IP address and an AS for each BGP neighbor on all links of the BGP node, as well as generating and distributing information such as the node's AS, liveliness of the neighbor nodes, link attributes such as addresses, a maximum transfer unit (MTU), and the like. Peering BGP nodes are configured to create a TCP session on a predetermined port number such as port 179, which indicates BGP as the application atop TCP. Once the TCP connection is operational, the peering BGP nodes establish the BGP session over the TCP connection. A route reflector is used to reduce the number of BGP peerings between nodes and avoid the formation of a full mesh of sessions among the nodes. For example, the root node and leaf nodes can form BGP sessions with a route reflector that acts as a focal point for the BGP sessions and concentrates traffic involving the root and leaf nodes. All BGP update messaging traverses the BGP route reflector.

The PCE receives link state information passively from one or more routers in the network either by snooping/joining link state protocols or using a link state protocol distribution mechanism such as BGP-LS. The PCE uses this information to construct an end-to-end view of the link state of the network, e.g., the layer-3 interfaces that connect the nodes of the network and form an underlay topology. To generate a service topology that is used to provide a service over the underlay topology, address family information for the service is advertised. For example, a multiprotocol BGP (MP-BGP) advertises address family information for a multicast virtual private network (MVPN) service. The address family information includes Address Family (AF) route types and network layer reachability information (NLRI). The PCE constructs transport tunnels that connect the root nodes that provide the service to the leaf nodes that receive the service. The forwarding information for the tunnels is then downloaded to the PCC. For example, a PCE peering with a route reflector can use BGP update messages to construct transport tunnels that connect the root node to a set of leaf nodes. The forwarding information for these tunnels is downloaded to the PCC via BGP p2mp sr-te policies. However, a PCC in a network that operates according to BGP is required to transmit service topology information to the PCE via another protocol such as PCEP. For example, without PCE peering to the route reflector, where the PCE can listen to the BGP update messages, a PCC in network that operates with BGP p2mp sr-te policy on the southbound direction is required to transmit north bound information (e.g., discovered resources like root and leaf nodes) via other protocols such as PCEP. The PCEP messages transmitted from the PCC to the PCE are relatively large if there are a large number of nodes in the network, which significantly increases the overhead required to provide the topology information to the PCE. The overhead problem is further exacerbated by the frequent transmission of the PCEP messages necessary to maintain up-to-date path computations in a dynamic network that is continuously adding and removing nodes. Furthermore, as discussed above, this approach requires implementing yet another protocol (e.g., PCEP) in nodes that already support BGP and the respective address families.

FIGS. 1-4 disclose a path computation element (PCE, or other controller in a network) that establishes a session with a route reflector that receives advertisements (such as BGP messages) from nodes in the network via corresponding sessions with the route reflector. The PCE uses its session with the route reflector to monitor the advertisements received by the route reflector and determine the topology of the network. For example, the PCE peering to the route reflector can be used to learn the topology of the network via listening to the BGP-LS updates. The route reflector can also learn network layer reachability information (NLRI) and route types for the address families. In addition, since the route reflector is a focal point of BGP speaking routers, and all BGP routers within an area have peering session to the route reflector, the BGP routes and NLRI traverse through the route reflector for all address families (AF). In some embodiments, the PCE monitors the BGP update messages arriving from the route reflector and listens to multicast virtual private network (MVPN) address family route types and NLRIs. The PCE identifies the nodes that are part of the multicast VPRN by examining these update messages and builds the tree from root to the leaves. The PCE then can use the information in the update messages to construct a tree that represents routes from the root node to the leaf nodes. The PCE generates forwarding instructions based on the identified routes and installs the forwarding instructions on the nodes along the routes. The PCE is a passive listener on the session and it uses the overheard information to construct the topological requirements.

Some embodiments of the route reflector operate according to the border gateway protocol (BGP) and the leaf nodes register for one or more virtual private network (VPN) services such as a multicast VPN (MVPN) provided by the root node, which also functions as a path computation client (PCC). The PCE monitors advertisements that identify the MVPN route type and AF between routers. For example, the PCE can listen to MVPN auto-discovery routes or (other route types) to learn which nodes are part of the MVPN domain. The PCE then uses the information in the monitored advertisements and the network link state compiled via BGP-LS, to build a point-to-multipoint tree and to generate the forwarding instructions that are used to forward the multicast PDUs from the root node to the leaf nodes via one or replicating nodes. Some embodiments of the PCE are configured to listen to subsets of the messages exchanged between the route reflector and the nodes. For example, the PCE and the route reflector can negotiate a set of address families. Messages associated with the negotiated set of address families are monitored by the PCE and other messages are ignored by the PCE. In some embodiments, the PCE recomputes the forwarding instructions in response to addition of a leaf, removal of a leaf, addition of a new provider tunnel type, and the like.

FIG. 1 is a block diagram of an IP network 100 that includes a controller 105 for configuring routes based on passive monitoring of advertisements according to some embodiments. The controller 105 includes a processor 110 for executing instructions or performing operations using information stored in a memory 115. The processor 110 reads instructions and data/operands from the memory 115 and writes the results of the operations back to the memory 115. The controller 105 also includes a transceiver 120 that transmits or receives signals. The transceiver 120 is implemented using a transmitter, a receiver, an integrated transceiver, or a combination thereof.

Some embodiments of the IP network 100 are implemented using interior gateway protocols (IGPs) including link state protocols such as open shortest path first (OSPF, OSPFv3), intermediate system-to-intermediate system (IS-IS), and the like. The link state protocols are used to identify links between nodes 121, 122, 123, 124, 125 (collectively referred to herein as "the nodes 121-125") in the IP network 100. To establish the links, the nodes 121-125 flood information indicating the status of locally connected networks and links of the nodes 121-125 across the IP network 100. The controller 105, which can be implemented as a path computation element (PCE) or other software defined networking (SDN) controller, computes SPF or traffic engineered (TE) paths across IGP areas and domain boundaries in the IP network 100. In the illustrated embodiments, the controller 105 identifies the links 131, 132, 133, 134 (collectively referred to herein as "the links 131-134") between the corresponding nodes 121-125. The nodes 121-125 and the links 131-134 represent an end-to-end view of the link state of the IP network 100, e.g., the layer-3 interfaces that connect the nodes 121-125 and form an underlay topology. The underlay topology is used to provide a service by establishing a service topology over the underlay topology.

Figure 2:
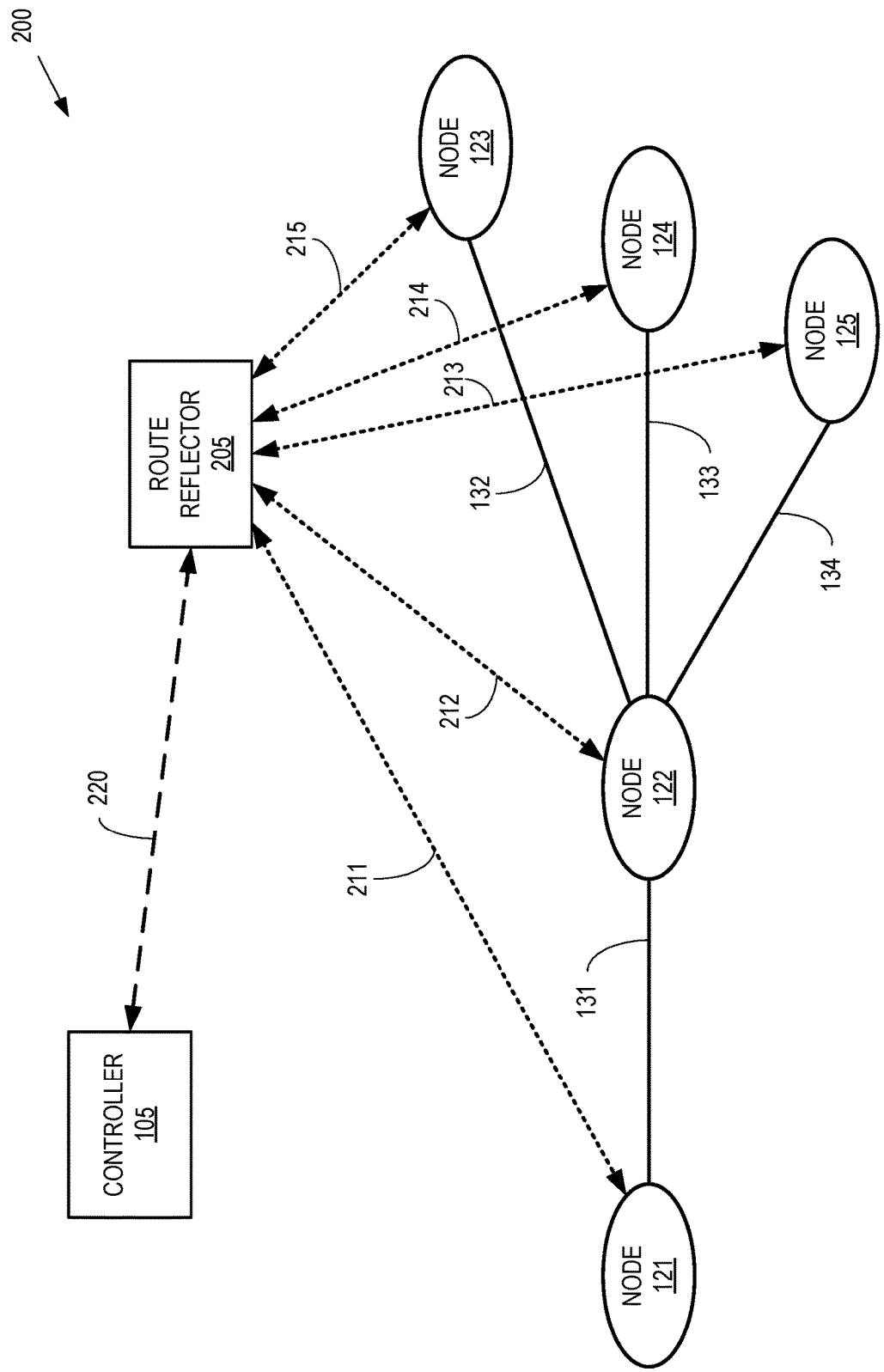
FIG. 2 is a block diagram of an IP network that supports a border gateway protocol (BGP) according to some embodiments.

FIG. 2 is a block diagram of an IP network 200 that supports a border gateway protocol (BGP) according to some embodiments. The IP network 200 is used to implement some embodiments of the IP network 100 shown in FIG. 1. In the illustrated embodiment, the IP network 200 includes the controller 105 and the nodes 121-125 shown in FIG. 1. The IP network 200 also supports the underlay topology indicated by the links 131-134.

A route reflector 205 is implemented in the IP network 200. The route reflector 205 establishes BGP sessions 211, 212, 213, 214, 215 (collectively referred to herein as "the BGP sessions 211-215") with the nodes 121-125. Implementing the route reflector 205 allows the nodes 121-125 to interconnect without generating a full mesh of BGP sessions between the nodes 121-125. The route reflector 205 also establishes a BGP session 220 with the controller 105 that allows the controller 105 to listen to messages broadcast by the route reflector 205. In some embodiments, the controller 105 and the route reflector 205 negotiate address families associated with services provided over the underlay topology indicated by the links 131-134. The services include, but are not limited to, unicast services such as virtual private networks (VPNs), multicast services such as MVPN, ethernet services such as EVPN, or other types of services that use BGP signaling. The controller 105 is a passive listener on the BGP session 220 and therefore does not advertise any route information over the BGP session 220.

Figure 3:
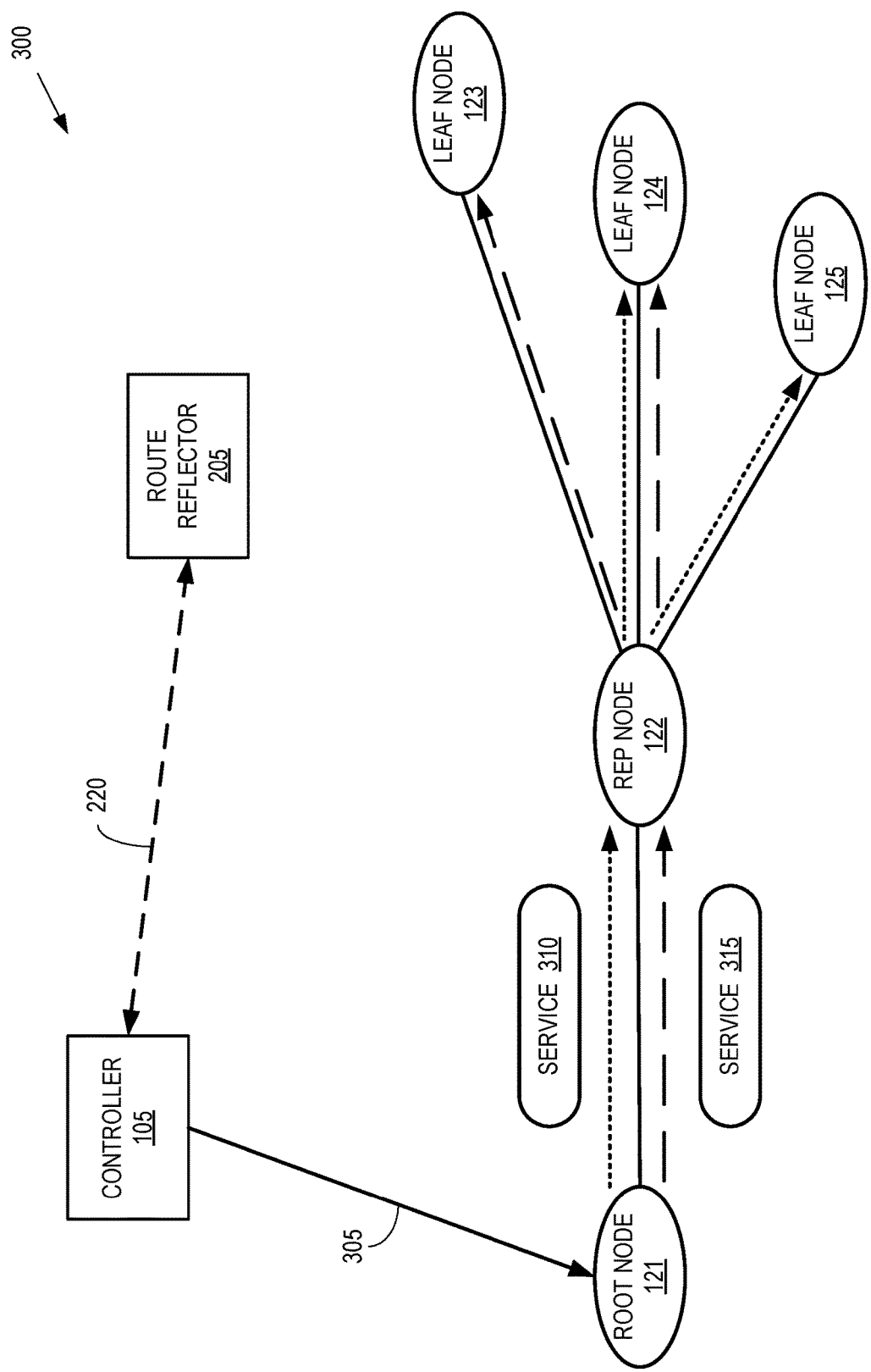
FIG. 3 is a block diagram of an IP network that includes a controller that monitors messages received by a route reflector via BGP signaling according to some embodiments.

FIG. 3 is a block diagram of an IP network 300 that includes a controller 105 that monitors messages received by a route reflector 205 via BGP signaling according to some embodiments. The IP network 300 is used to implement some embodiments of the IP network 100 shown in FIG. 1 and the IP network 200 shown in FIG. 2. In the illustrated embodiment, the IP network 300 includes the controller 105 and the nodes 121-125 shown in FIG. 1. The IP network 300 also supports the underlay topology indicated by the links 131-134 shown in FIGS. 1 and 2. These links are not indicated by reference numerals in FIG. 3 in the interest of clarity.

In the illustrated embodiment, the IP network 300 supports services 310, 315 that provides services from the node 121 (which is therefore referred to as the root node 121) to subsets of the nodes 123-125 (which are therefore referred to as the leaf nodes 123-125) via a (replicating) node 122. For example, the root node 121 provides the service 310 to the leaf nodes 124, 125, as indicated by the dotted arrows. For another example, the root node 121 provides the service 315 to the leaf nodes 123, 124, as indicated by the dashed arrows. The leaf nodes 123-125 advertise their intention to join one or more of the services 310, 315 using messages such as advertisements that are transmitted via BGP sessions 211-215 (as shown in FIG. 2 but not shown in FIG. 3 in the interest of clarity). For example, the leaf nodes 123-125 can advertise auto-discovery routes associated with one or more of the services 310, 315. Some embodiments of the advertisements include a tuple formed of a source identifier that indicates the root node 121 and a group identifier that indicates the corresponding service 310, 315. The advertisements can also include information indicating an address family associated with the leaf node 123-125 or the service 310, 315, network layer reachability information (NLRI) associated with the address family, a route type associated with the address family, and the like. The service types for the services 310, 315 include, but are not limited to, unicast or multicast services such as VPN, MVPN, EVPN, or other services that utilize BGP signaling.

The controller 105 monitors signaling received over the BGP session 220 to passively listen to BGP signaling that is communicated between the nodes 121-125 via the route reflector 205. The controller 105 monitors the advertisements and thereby learns identities of the nodes that are participating in the multicast tree, which includes the root node 121 and the leaf nodes 123-125. If the controller 105 and the route reflector 205 have negotiated address families for monitoring, the controller 105 monitors the messages or advertisements associated with the negotiated address families. The controller 105 uses the information in the monitored messages/advertisements to build trees that represent the service topologies for the corresponding services 310, 315. For example, the tree that represents the service topology for the service 310 includes the root node 121, the replicating node 122, and the leaf nodes 124, 125. For another example, the tree that represents the service topology for the service 315 includes the root node 121, the replicating node 122, and the leaf nodes 123, 124. The controller 105 builds the tree via the received information and its knowledge of the network link state, which it obtained via BGP-LS or equivalent means. The controller 105 also builds transport tunnels for the services 310, 315. The transport tunnels are then configured at the nodes 121-125 by downloading the information from the controller 105 to the node 121, as indicated by the arrow 305.

Some embodiments of the controller 105 monitor auto-discovery routes via the BGP session 220 to detect changes in the service topology. For example, the controller 105 can determine the routes type indicated in an auto-discovery route transmitted by a leaf node 123-125 and, based on the route type determine whether the leaf node 123-125 that generated the auto-discovery route is being added to or removed from a corresponding one of the services 310, 315, or if a new provider tunnel type is being added for the service 310, 315 indicated by the source-group tuple <S, G>. For example, the controller 105 can determine whether a service indicated by an <S, G> tuple is moving from inclusive P-Multicast service interface (PMSI) to selective PMSI.

The controller 105 selectively performs different operations based on the route types in the auto-discovery messages. For example, the controller 105 builds a leaf list for each tree in response to determining that the Intra-AS/inter-AS I-PMSI auto-discovery routes are advertised. The controller 105 can also learn the tree identifier from a BGP provider tunnel attribute (PTA) that is included in the auto-discovery route, e.g., a PTA tunnel ID can provide the tree identifier based on the PTA tunnel type. For another example, the controller 105 can learn if an <S, G> moved from an inclusive PMSI to selective PMSI in response to S-PMSI auto-discovery routes being advertised to indicate a new selective tunnel and its tree identifier based on the PTA tunnel type. For yet another example, the controller 105 can learn if one of the leaf nodes 123-125 has been removed from a list associated with one of the services 310, 315.

Based on the above BGP MVPN Route types and information detected in the auto-discovery routes, the controller 105 can build the tree from the root node 121 to the leaf nodes 123-125 and associate the tree with a corresponding tree-identifier. The controller 105 then downloads configuration information such as a point-to-multipoint policy to the root node 121 of the tree and, if necessary, the replication segment to the root node 121, the transit or replication node 122, and the leaf nodes 123-125. Some embodiments of the controller 105 enable or disable address families, e.g., based on negotiations are information exchanged between the controller 105 and the route reflector 205.

Figure 4:
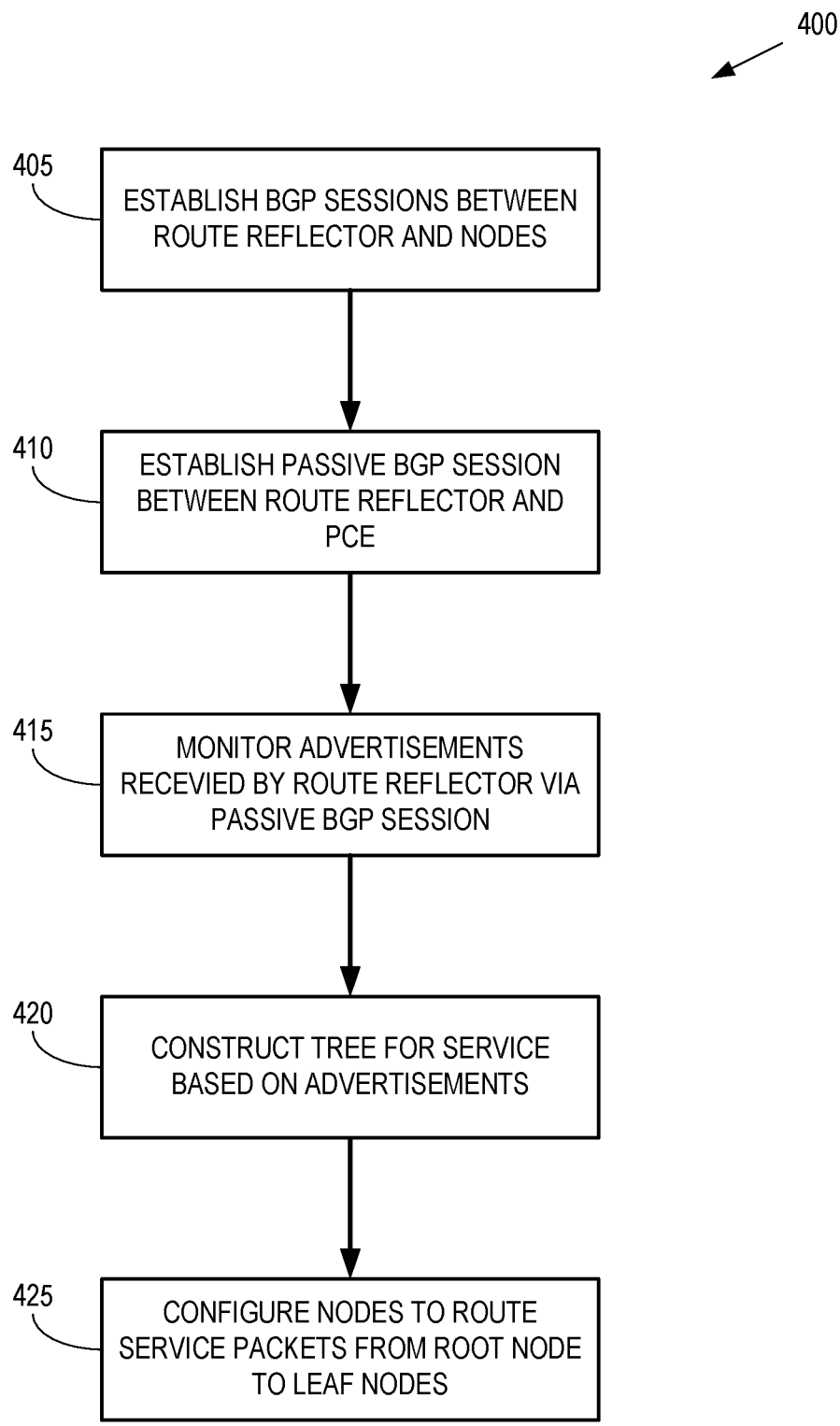
FIG. 4 is a flow diagram of a method of configuring routes based on passive monitoring of a BGP session with a route reflector according to some embodiments.

FIG. 4 is a flow diagram of a method 400 of configuring routes based on passive monitoring of a BGP session with a route reflector according to some embodiments. The method 400 is implemented in some embodiments of the IP network 100 shown in FIG. 1, the IP network 200 shown in FIG. 2, and the IP network 300 shown in FIG. 3.

At block 405, BGP sessions are established between the route reflector and nodes in the network. At block 410, a passive BGP session is established between the route reflector and a controller such as a PCE. At block 415, the controller uses the passive BGP session to monitor advertisements received by the reflector. At block 420, the controller uses the information in the monitored advertisements to construct (or modify) a tree that represents root, replication, and leaf nodes for a service provided by the root node. At block 425 the controller provides information that is used to configure the nodes to route packets associated with the services from the root node to the leaf nodes, potentially via one or more transit or replication nodes.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
at least one processor; and
at least one memory storing instructions which, when executed by the at least one processor, cause the apparatus at least to:
establish, at a controller, a first session with a route reflector;
monitor, at the controller, advertisements received by the route reflector from nodes in a network via second sessions established between the nodes and the route reflector;
generate, at the controller, forwarding instructions for the nodes based on the advertisements, wherein the forwarding instructions indicate at least one route from a root node to at least one leaf node of a service; and
provide, from the controller, the forwarding instructions to the root node.

2. The apparatus of claim 1, wherein the instructions, when executed by the at least one processor, cause the apparatus at least to:
determine a topology of the network based on the advertisements.

3. The apparatus of claim 1, wherein the instructions, when executed by the at least one processor, cause the apparatus at least to:
determine at least one of an address family based on the advertisements, network layer reachability information (NLRI) for the address family, or a route type for the address family.

4. The apparatus of claim 1, wherein the instructions, when executed by the at least one processor, cause the apparatus at least to:
generate the forwarding instructions by identifying the root node in the nodes and the at least one leaf node in the nodes based on the advertisements.

5. The apparatus of claim 4, wherein the instructions, when executed by the at least one processor, cause the apparatus at least to:
generate a tree indicating at least one route from the root node to the at least one leaf node.

6. The apparatus of claim 5, wherein the instructions, when executed by the at least one processor, cause the apparatus at least to:
generate the forwarding instructions based on the tree; and
provide the forwarding instructions for installation in nodes along the at least one route.

7. The apparatus of claim 1, wherein the instructions, when executed by the at least one processor, cause the apparatus at least to:
establish the first session according to a border gateway protocol (BGP), wherein the second sessions are established according to the BGP.

8. The apparatus of claim 7, wherein the instructions, when executed by the at least one processor, cause the apparatus at least to:
determine that the at least one leaf node registered for at least one virtual private network (VPN) service based on the advertisements.

9. The apparatus of claim 8, wherein the instructions, when executed by the at least one processor, cause the apparatus at least to:
monitor VPN auto-discovery routes to learn which of the nodes are part of a VPN domain.

10. The apparatus of claim 9, wherein the instructions, when executed by the at least one processor, cause the apparatus at least to:
recompute the forwarding instructions in response to at least one of addition of a leaf node, removal of a leaf node, or addition of a new provider tunnel type.

11. The apparatus of claim 1, wherein the instructions, when executed by the at least one processor, cause the apparatus at least to:
monitor subsets of messages exchanged between the route reflector and the nodes via the second sessions.

12. The apparatus of claim 11, wherein the instructions, when executed by the at least one processor, cause the apparatus at least to:
negotiate a set of address families with the route reflector; and
monitor a subset of the messages associated with the set of address families.

13. A method comprising:
establishing, at a controller, a first session with a route reflector;
monitoring, at the controller, advertisements received by the route reflector from nodes in a network via second sessions established between the nodes and the route reflector;
generating, at the controller, forwarding instructions for the nodes based on the advertisements, wherein the forwarding instructions indicate at least one route from a root node to at least one leaf node of a service; and
providing, from the controller, the forwarding instructions to the root node.

14. The method of claim 13, wherein generating the forwarding instructions comprises determining a topology of the network based on the advertisements.

15. The method of claim 13, wherein generating the forwarding instructions comprises determining at least one of an address family based on the advertisements, network layer reachability information (NLRI) for the address family, or a route type for the address family.

16. The method of claim 13, wherein generating the forwarding instructions comprises identifying the root node in the nodes and the at least one leaf node in the nodes based on the advertisements.

17. The method of claim 16, wherein generating the forwarding instructions comprises generating a tree indicating at least one route from the root node to the at least one leaf node.

18. The method of claim 17, wherein generating the forwarding instructions comprises generating the forwarding instructions based on the tree, and wherein providing the forwarding instructions comprises providing the forwarding instructions for installation in nodes along the at least one route.

19. The method of claim 13, wherein establishing the first session comprises establishing the first session according to a border gateway protocol (BGP), and wherein the second sessions are established according to the BGP.

20. The method of claim 19, wherein generating the forwarding instructions comprises determining that the at least one leaf node registered for at least one virtual private network (VPN) service based on the advertisements.

21. The method of claim 20, wherein monitoring the advertisements comprises monitoring VPN auto-discovery routes to learn which of the nodes are part of a VPN domain.

22. The method of claim 21, further comprising:
recomputing the forwarding instructions in response to at least one of addition of a leaf node, removal of a leaf node, or addition of a new provider tunnel type.

23. The method of claim 13, wherein monitoring the advertisements comprises monitoring subsets of messages exchanged between the route reflector and the nodes via the second sessions.

24. The method of claim 23, further comprising:
negotiating a set of address families with the route reflector, and wherein monitoring the advertisements comprises monitoring a subset of the messages associated with the set of address families.

* * * * *